United States Patent
Kent, Jr. et al.

(10) Patent No.: US 7,548,585 B2
(45) Date of Patent: Jun. 16, 2009

(54) AUDIO STREAM ADAPTIVE FREQUENCY SCHEME

(75) Inventors: Larry G. Kent, Jr., Loganville, GA (US); W. Todd Daniell, Marietta, GA (US); Joel A. Davis, Marietta, GA (US); Brian K. Daigle, Marietta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1480 days.

(21) Appl. No.: 10/364,694

(22) Filed: Feb. 10, 2003

(65) Prior Publication Data

US 2004/0156622 A1    Aug. 12, 2004

(51) Int. Cl.
*H04N 7/18* (2006.01)
(52) U.S. Cl. .............. 375/240.25; 375/240.26
(58) Field of Classification Search ...... 348/423.1–441; 375/240.01–240.29
See application file for complete search history.

(56) References Cited

U.S. PATENT DOCUMENTS

| | | | |
|---|---|---|---|
| 5,561,466 A * | 10/1996 | Kiriyama | 375/240.25 |
| 5,822,537 A | 10/1998 | Katseff et al. | |
| 6,625,656 B2 | 9/2003 | Goldhor et al. | |
| 6,665,751 B1 | 12/2003 | Chen et al. | |
| 6,704,281 B1 * | 3/2004 | Hourunranta et al. | 370/230 |
| 6,754,273 B1 * | 6/2004 | Sackstein et al. | 375/240.21 |
| 6,885,987 B2 * | 4/2005 | Buchholz et al. | 704/228 |

2002/0013949 A1    1/2002  Hejna, Jr.

OTHER PUBLICATIONS

U.S. Official Action dated Jan. 12, 2007 in U.S. Appl. No. 10/364,562.
U.S. Official Action dated Mar. 25, 2008 in U.S. Appl. No. 10/364,562.
U.S. Appl. No. 10/364,562, filed Feb. 10, 2003, entitled "Video Stream Adaptive Frame Rate Scheme", Inventors: Kent, Jr. et al.
U.S. Official Action dated Jun. 5, 2007 in U.S. Appl. No. 10/364,562.
U.S. Official Action dated Sep. 25, 2007 in U.S. Appl. No. 10/364,562.
Response to Office Action dated Jan. 12, 2007, filed Mar. 13, 2007 in U.S. Appl. No. 10/364,562.
Response to Office Action dated Jun. 5, 2007, filed Jul. 20, 2007 in U.S. Appl. No. 10/364,562.
Response to Office Action dated Sep. 25, 2007, filed Dec. 21, 2007 in U.S. Appl. No. 10/364,562.
Response to Office Action dated Mar. 25, 2008, filed Jul. 25, 2008 in U.S. Appl. No. 10/364,562.
U.S. Official Action dated Oct. 28, 2008 in U.S. Appl. No. 10/364,562.

* cited by examiner

*Primary Examiner*—Andy S Rao
(74) *Attorney, Agent, or Firm*—Hope Baldauff Hartman, LLC

(57) ABSTRACT

A system for an audio stream adaptive frequency comprises an audio capture device for sending audio samples captured from an audio source and an audio playback device for receiving the audio samples. The audio playback device includes a playback buffer and is configured to adjust playback of the audio samples from the playback buffer when the buffer is not within a designated target range. Other systems and methods are also provided.

3 Claims, 7 Drawing Sheets

AUDIO STREAM ADAPTIVE FREQUENCY SCHEME

TECHNICAL FIELD

The present invention is generally related to communications and, more particularly, is related to audio communications.

BACKGROUND OF THE INVENTION

When streaming audio capture and playback audio sample clocks are not synchronized, playback buffers are often slowly starved or flooded with audio data. This can cause the audio playback to break up.

One current approach is to wait until the playback buffer has become empty or overflowed. Once this has happened, the playback is stopped and restarted at the optimal buffer level. This results in audio breaking up. The Moving Pictures Experts Group (MPEG) utilizes systems that encode clocking information in the stream to synchronize capture and playback clocks. However, delays may still result in erratic playback.

Thus, a heretofore-unaddressed need exists for a solution that addresses the aforementioned deficiencies and inadequacies.

SUMMARY OF THE INVENTION

The preferred embodiments of the present invention provide systems and methods for providing an audio stream adaptive frequency system.

Briefly described, in architecture, one preferred embodiment of one system, among others, can be implemented as follows. An audio stream adaptive frequency system comprises an audio capture device for sending audio samples captured from an audio source and an audio playback device for receiving the audio samples. The audio playback device includes a playback buffer and is configured to adjust playback of the audio samples from the buffer when the buffer is not within a designated target range.

The preferred embodiment of the present invention can also be viewed as providing methods for providing an audio stream adaptive frequency system. In this regard, one embodiment of such a method, among others, can be broadly summarized by the following steps: receiving an audio source at a playback buffer; and adjusting a buffer level of the playback buffer when the buffer level is not within a designated target range.

Other systems, methods, features, and advantages of the present invention will be or become apparent to one with skill in the art upon examination of the following drawings and detailed description. It is intended that all such additional systems, methods, features, and advantages be included within this description, and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF THE PREFERRED EMBODIMENTS

Disclosed herein are systems and methods for providing an audio stream adaptive frequency system. To facilitate description of the inventive systems, an example system that can be used to implement the systems and methods for providing an audio stream adaptive frequency system is discussed with reference to the figures. Although this system is described in detail, it will be appreciated that this system is provided for purposes of illustration only and that various modifications are feasible without departing from the inventive concept.

For example, while several embodiments are described in connection with these drawings, there is no intent to limit the invention to the embodiment or embodiments disclosed herein. On the contrary, the intent is to cover all alternatives, modifications, and equivalents. Additionally, while the following description and accompanying drawing specifically describes audio stream adaptive frequencies, it will be clear to one of ordinary skill in the art that the systems and methods presented herein may be extended to other audio streaming applications such as voice-over Internet protocol (VoIP), video conferences, etc. After the example system has been described, an example of the operation of the system will be provided to explain the manner in which the system can be used to provide an audio stream adaptive frequency system.

Figure 1:
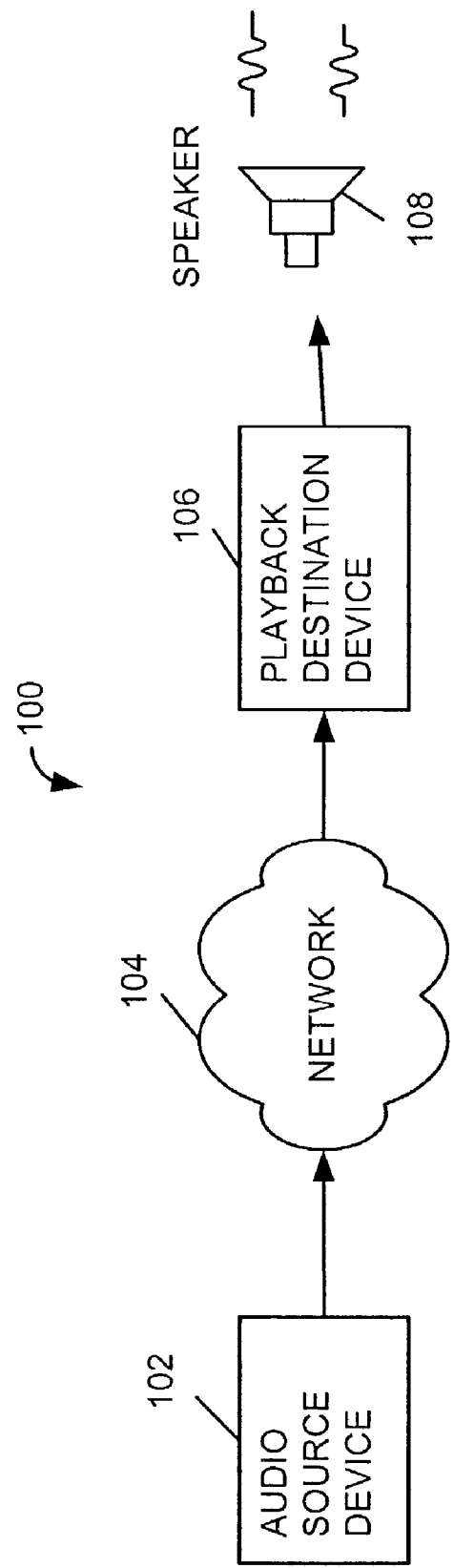
FIG. 1 is a block diagram depicting a system in which an audio stream adaptive frequency system may be implemented.

Referring now in more detail to the drawings, in which like numerals indicate corresponding parts throughout the several views, FIG. 1 is a block diagram depicting a system 100 in which an audio stream adaptive frequency system may be implemented. The system 100 includes an audio source device 102, a network 104, playback destination device 106 and playback hardware, such as a speaker 108. Some embodiments include speaker 108 as part of the playback destination device 106. In an example, the audio source device 102 captures an audio source at certain frequencies, for instance 8000 Hz, utilizing any known audio capture methods such as sampling, encoding, pulse code modulation, compression, or MPEG, among others. The frequencies captured at the audio source device 102 may not be exact and may deviate a few percentages above or below the desired frequencies. For instance, the audio source may be at 8100 Hz or 7999 Hz. The audio source device 102 includes a buffer (not shown) that fills as the audio source is captured. In an example, the buffer is included on an adapter card in the audio source device 102, such as a personal computer that begins to fill when writing to the buffer. The buffer continues to fill with the audio data, sends the audio data to the network and begins filling again. Thus, the buffer fills in a continuous circular process.

The network 104 may be any type of communications network employing any network topology, transmission medium, or network protocol. For example, such a network may be any public or private packet-switched or other data network, including the Internet, circuit-switched network, such as a public switch telecommunications network (PSTN), wireless network, or any other desired communications infrastructure and/or combination of infrastructure.

The playback destination device 106 can be a computer. The playback destination device receives the audio data from the network 104 and places the audio into a playback buffer (not shown). In an example, the playback buffer starts filling with audio data in memory and continues to fill until the buffer reaches a certain point of fullness, at which time the playback buffer plays the audio out on the speaker 108.

Figure 2:
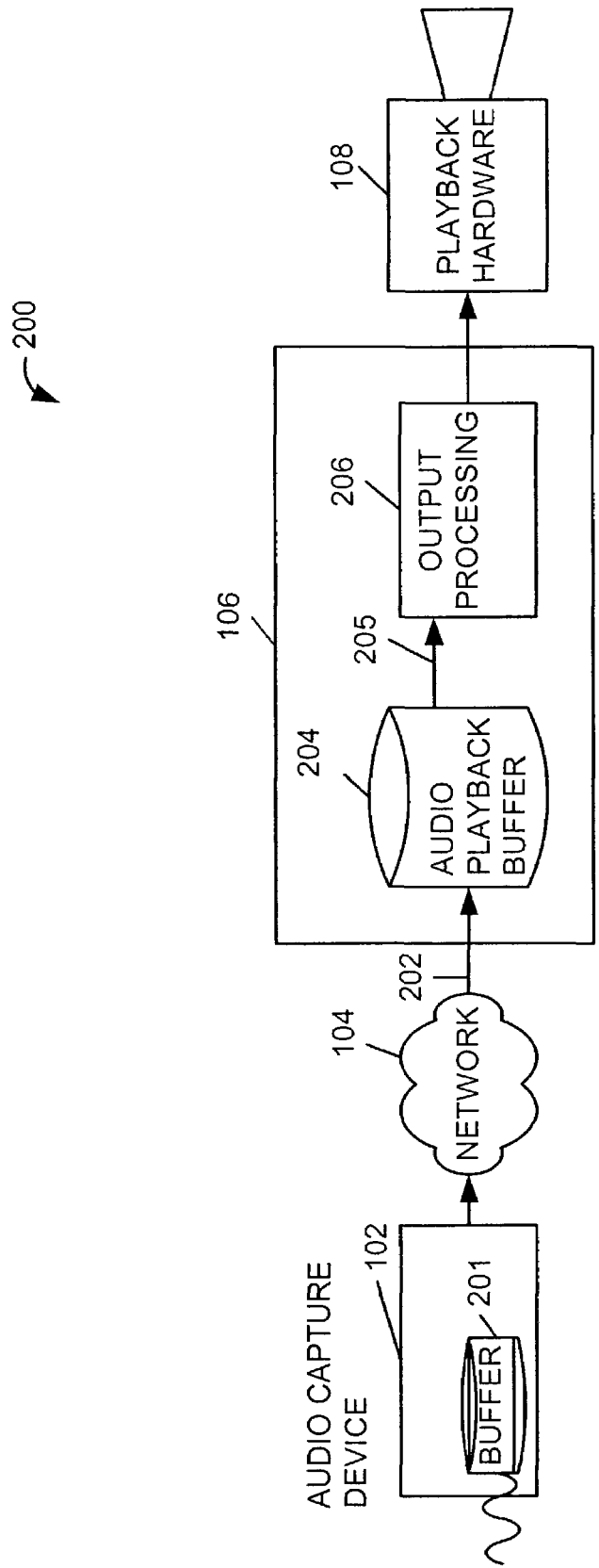
FIG. 2 is a block diagram depicting an embodiment of a system in which an audio stream adaptive frequency system may be implemented.

FIG. 2 is a block diagram depicting an embodiment of a system 200 in which an audio stream adaptive frequency system may be implemented. The system 200 includes audio capture device 102, with a processing device for providing packetized samples, a network 104, an audio playback device 106 and playback hardware 108. Output from an audio source is captured in a buffer 201 of the audio capture device 102. In an example, an audio source may be provided by microphones, compact disc players, video cameras, video cassette recorders, DVD players, among others. In a preferred embodiment, pulse code modulation (PCM) is utilized to produce the packetized samples. The packetized samples are sent over the network 104 to the audio playback device 106. Compression and encoding may also be used before transmission in some embodiments.

In a preferred embodiment, the audio playback device 106 is a computer that includes, inter alia, an audio playback buffer 204 and output processing 206. Preferably, the audio playback buffer 204 is included in memory in the audio playback device 106. Of course, other system memory may also be used for the audio playback buffer 204. Packetized samples 202 from the network 104 are received at the audio playback buffer 204. In an example, output processing 206 provides for adjusting the play rate of the samples 205 from the audio playback buffer 204 to the playback hardware 108 such that a listener does not perceive degradation in sound.

In operation, the audio playback buffer 204 is configured such that a buffer fill level can be established, and the buffer fill level can be adjusted to ensure the buffer 204 is not too full or too low. If the buffer 204 becomes too full, i.e., the amount of audio data is above a threshold, more samples are released out of the buffer 204 at a faster rate. If the buffer 204 becomes too low, samples are released from the buffer 204 at a slower rate. In addition, the adjustments of the buffer 204 (i.e., release rate changes) are determined by how far the buffer fill level is off from a preferred fill level range. The audio capture buffer 201 threshold levels are not adjusted, but the audio playback buffer fill level range is effectively adjusted. The audio playback buffer 204 and output processing 206 provide for audio playback through the speaker that has substantially undetectable changes in audio sound to a listener.

Figure 3:
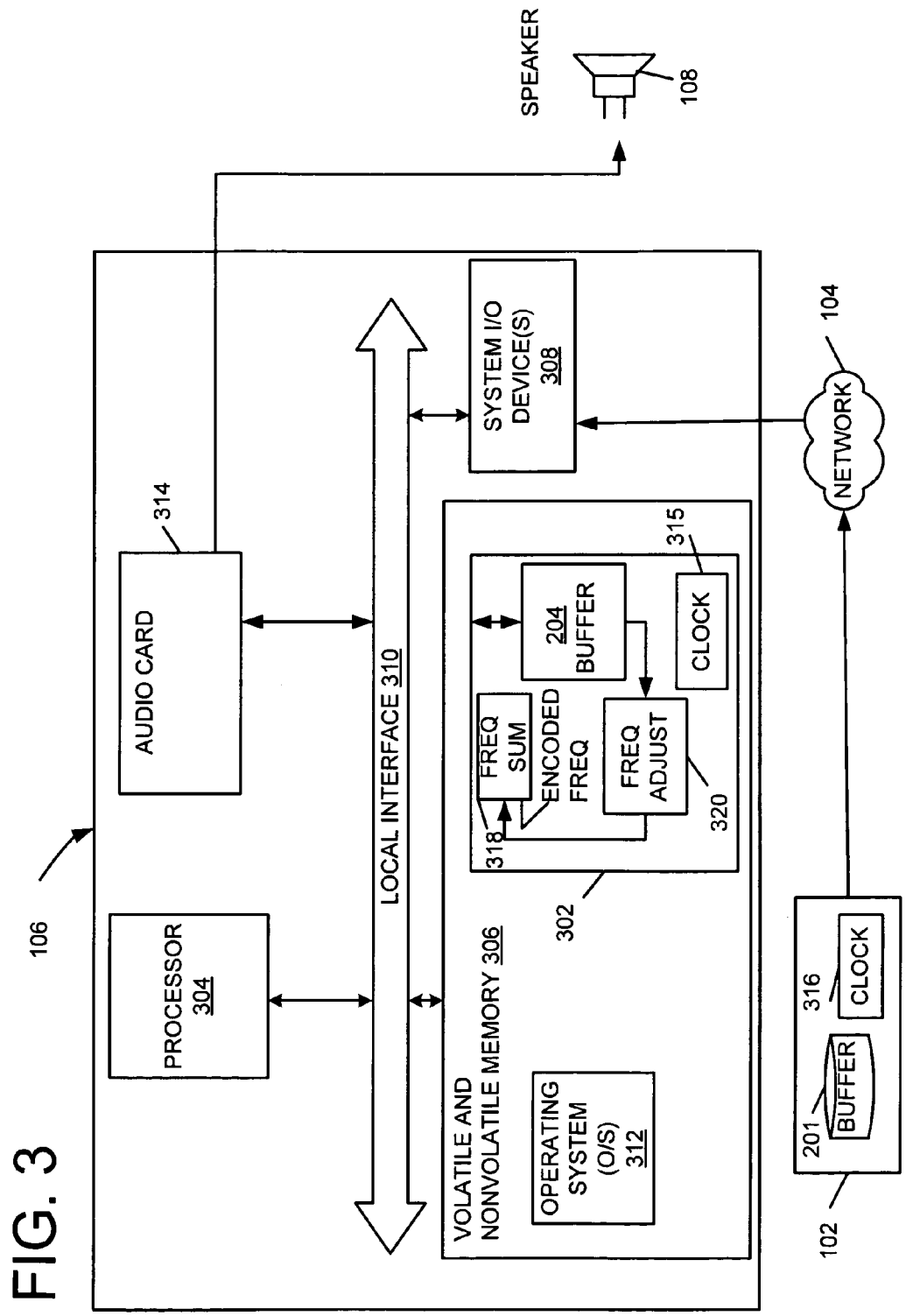
FIG. 3 is a block diagram depicting one example of a computing device in more detail that can be used to implement one preferred embodiment of an audio stream adaptive frequency system.

FIG. 3 is a block diagram depicting one example of a computing device 106 in more detail that can be used to implement one preferred embodiment of an audio stream adaptive frequency system. In a preferred embodiment, the computing device 106 comprises an audio playback device. The audio playback device 106 includes adaptive frequency algorithm logic 302 that can be implemented in software (e.g., programming stored on a medium, firmware, etc.), hardware, or a combination thereof. In the preferred embodiments, the adaptive frequency algorithm logic 302 is implemented in software as an executable program, and is executed by a special or general purpose digital computer, such as a personal computer (PC; IBM-compatible, Apple-compatible, or otherwise), workstation, minicomputer, or mainframe computer.

Generally, in terms of hardware architecture, the audio playback device 106 includes, inter alia, a processor 304 and memory 306. Input and/or output (I/O) devices 308 (or peripherals) can be communicatively coupled to a local interface 310. The local interface 310 can be, for example but not limited to, one or more buses or other wired or wireless connections, as is known in the art. The local interface 310 may have additional elements, which are omitted for simplicity, such as controllers, buffers (caches), drivers, repeaters, and receivers, to enable communications. Further, the local interface 310 may include address, control, and/or data connections to enable appropriate communications among the aforementioned components.

The processor 304 is preferably a hardware device for executing software, particularly that stored in memory 306. The processor device 304 can preferably be any custom made or commercially available processor, a central processing unit (CPU), an auxiliary processor among several processors, a semiconductor based microprocessor (in the form of a microchip or chip set), a macroprocessor, or generally any device for executing software instructions.

The memory 306 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 306 may incorporate electronic, magnetic, optical, and/or other types of storage media. Note that the memory 306 can have a distributed architecture, where various components are situated remote from one another, but can be accessed by the processor 304.

The software and/or firmware in memory 306 may include one or more separate programs, each of which comprises an ordered listing of executable instructions for implementing logical functions. In the example of FIG. 3, the software in the memory 306 includes the adaptive frequency algorithm logic 302 and a suitable operating system (O/S) 312. The operating system 312 essentially controls the execution of other computer programs, such as logic 302 and an audio card 314, and provides scheduling, input-output control, file and data management, memory management, and communication control and related services. In a preferred embodiment, the logic 302 includes the audio playback buffer 204, a frequency summation device (herein after referred to as a frequency summer) 318, a frequency adjust device (herein after referred to as frequency adjuster) 320, and a clock 315. In a preferred embodiment, the audio playback buffer 204, frequency summer 318 and frequency adjuster 320 encompass a frequency adjust algorithm. Preferably, the output from the buffer 204 goes to the audio card 314.

In an example, the logic 302 is configured to drive the reading rate of the buffer 204 to release samples faster or slower by for instance, changing the playback frequency, such that a target fill level range is maintained. The audio playback buffer 204 is sized based on target sample rates and delay. For example, the audio playback buffer 204 can be configured to allocate 100 samples at frequency sample rate, such as, 8000 Hz sample rate with each sample representing ⅛₀₀₀ of a second. 8000 Hz is preferably established as the frequency rate which provides satisfactorily listening for a user. In addition, 8000 Hz provides for about 200 msec of audio data in the buffer. In some embodiment, other frequency sample rates are utilized.

In an example, if a target range for buffer sized to hold 100 samples, is established of about 50 samples, when the audio playback buffer 204 has received and stored 50 samples from the network 104, the audio card 314 begins to read samples beginning at a designated address in the audio playback buffer 204. In an ideal environment, samples in the buffer 204 are read beginning at the $51^{st}$ sample. Samples are continually being placed in the audio playback buffer 204 as they are received from the network 104. The audio card 314 continues to read samples at the desired frequency and the samples are played at the speaker 108 or alternatively, are played at a playback device in the audio card 314.

In a typical environment, the network 104 may begin to send samples to the audio playback buffer 204 that are above or below the target sample range. In this situation, the logic 302 adjusts the playback frequency with a goal of maintaining a target level range of samples in the buffer 204. In an example, a play frequency, such as 8000 Hz, is established for the playback destination device 106 for an 'n' sample playback buffer 204. When the playback buffer 204 is within the preferred target buffer range, the playback frequency is not adjusted by the frequency adjuster 320. If the playback buffer 204 is not within the target buffer range, the playback frequency is adjusted by the frequency adjuster 320. The frequency adjuster 320 is preferably configured to determine an offset frequency. The offset frequency is sent to the frequency summer 318 and added to the encoded frequency to become the play frequency for reading samples from the playback buffer 204. Preferably, the encoded frame rate for the frequency summer 318 typically comes from the transmitted data being received from the network 104. Thus, the offset frequency is used to increase or decrease the rate of samples read from the playback buffer 204.

The playback frequency is adjusted based on the fill level of playback buffer 204. As the fill level of the playback buffer 204 increases, the playback frequency is increased to release more samples from the playback buffer 204 to bring the playback buffer 204 down to the target range. When the playback buffer level decreases, the playback frequency is decreased to bring the playback buffer up to target range. The logic 302 attempts to keep 'n' number of milliseconds audio samples in the audio playback buffer by varying the playback frequency. The logic 302 ultimately locks on to the source capture frequency. The maximum playback frequency deviation can be limited to prevent perceptible distortion in the audio sound.

The adaptive frequency algorithm logic 302 is preferably a source program, executable program (object code), script, or any other entity comprising a set of instructions to be performed. When logic 302 is implemented as a source program, then the program needs to be translated via a compiler, assembler, interpreter, or the like, which may or may not be included within the memory 306, so as to operate properly in connection with the O/S 312. Furthermore, logic 302 can be written as (a) an object oriented programming language, which has classes of data and methods, or (b) a procedure programming language, which has routines, subroutines; and/or functions, for example but not limited to, C, C++, Pascal, Basic, Fortran, Cobol, Perl, Java, and Ada.

The I/O devices 308 may preferably include input devices, for example but not limited to, a keyboard, mouse, scanner, microphone, etc. Furthermore, the I/O devices 308 may also include output devices, for example but not limited to, a printer, display, etc. Finally, the I/O devices 308 may further include devices that communicate both inputs and outputs to the network 104 and speaker 108, for instance but not limited to, a modulator/demodulator (modem; for accessing another device, system, or network), a radio frequency (RF) or other transceiver, a telephonic interface, a bridge, a router, etc.

When the logic 302 is implemented in software, it should be noted that the logic 302 could preferably be stored on any computer-readable medium for use by or in connection with any computer-related system or method. The logic 302 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a 'computer-readable medium' stores the program for use by a computer. The computer-readable medium includes the following: a portable computer diskette (magnetic), a random access memory (RAM) (electronic), a read-only memory (ROM) (electronic), an erasable programmable read-only memory (EPROM, EEPROM, or Flash memory), and a portable compact disc read-only memory (CDROM) (optical). If implemented in hardware, as in an alternative embodiment, the logic 302 can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

In operation, an audio capture sample clock 316 of the audio capture device 102 and audio playback sample clock 315 of the audio playback device 106 are effectively synchronized to provide continuous uninterrupted audio. The audio playback buffer 204 level is monitored and used to dynamically adjust the audio playback frequency. The playback frequency is constantly adjusted utilizing logic 302 to maintain the preferred number of samples in the audio playback buffer 204, and thus lock on the frequency of the remote audio capture source 102. In addition to stabilizing an audio stream by matching it to a particular source capture frequency, minor delays in the network can be compensated. Thus, audio interruptions are minimized or prevented. The enhanced stability allows for smaller audio capture buffers 201 so transmission-buffering delays are minimized.

Figure 4:
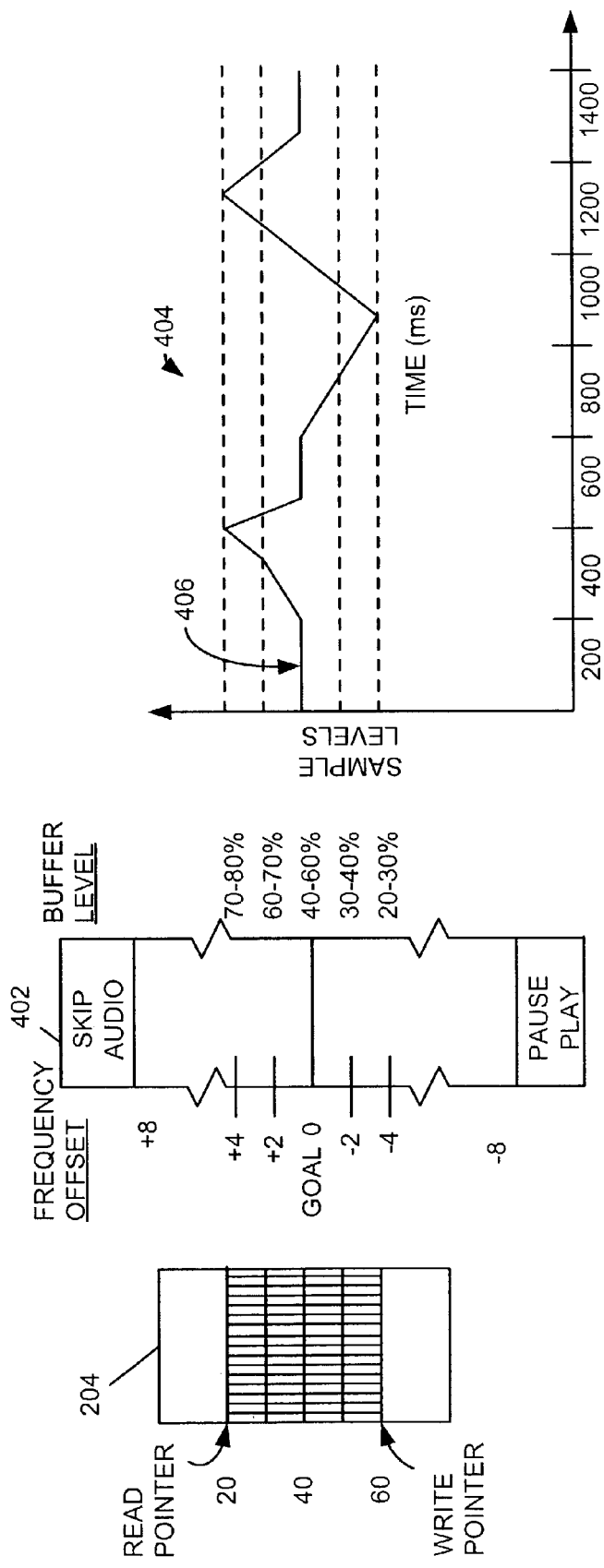
FIG. 4A is an illustrative example of a buffer of an audio stream adaptive frequency system.
FIG. 4B is an illustrative example of a graphical illustration of a target fill ranges of a buffer of an audio stream adaptive frequency system.
FIG. 4C is a graphic representation of adjusting the buffer fill levels of the buffer of FIG. 4B.

FIG. 4A is an illustrative example of a buffer 204 of an audio stream adaptive frequency system. In a preferred embodiment, the buffer 204 is configured as a contiguous area of memory. In an example, a read pointer of the audio card 314 begins reading audio samples from the buffer 204 at memory address location 20. Once audio samples have been read from a location in memory of the buffer 204, that space becomes an available space to be written into. In an example, the audio card 314 continues to read audio samples up to location 60. Once audio samples are read from the buffer 204, the samples can be played by the audio card 314 or alternatively by playback device 108. The write pointer at location 60 is set by logic 302. The write pointer preferably represents the next location to be filled with audio samples. In an example with a rolling buffer of continuously addressed memory, the last read location is subtracted from the last write location (adjusting for when roll-over occurs with the last write location) to determine how high or low the buffer 204 level is, and that level is compared to the target fill level range to determine the amount of frequency offset needed. The play frequency, i.e., how fast the audio card 314 is reading through the buffer 204 is adjusted by logic 302 to maintain audio samples in the buffer 204 within target fill level range.

FIG. 4B is an illustrative example of a graphical illustration 402 of a target fill range of the buffer 204 of an audio stream adaptive frequency system. In an example, when the buffer 204 has received between 40-60% of samples from the network 104, the buffer 204 is considered at a target goal level. As long as the number of samples in the buffer 204 are at goal, the frequency rate of samples leaving the buffer 204 will not be adjusted, i.e., the frequency offset is zero. As the buffer 204 levels deviate from the target range, the frequency is adjusted such that the buffer level returns to the target range. As long as the buffer fill level is within a specified percentage of the target range, the frequency is not adjusted. For example, if at around 8000 Hz, the samples in the buffer 204 are 40-60%, which is acceptable, and the buffer fill level is not adjusted. In a preferred embodiment, the frequency is adjusted in a graduated manner. In an example, at buffer levels of 60-70%, the frequency offset is about +2% to increase the rate of samples taken out of the buffer 204 to bring the buffer level down to target range. In an example, buffer levels of 30-40%, the frequency offset is about –2% to decrease the rate of samples taken out of the buffer 204 to bring the buffer level up to target range.

The frequency offset can be increased or decreased in increments. The frequency can be adjusted as desired however, adjustments should be made such that a user does not notice a perceptible degradation in audio sound. In an example, when a frequency offset of about –8% is required, the buffer level is close to zero, and thus audio play is paused or lost. In an example, when the frequency offset of about +8% is required the buffer level is close to 100% and thus audio play is skipped.

FIG. 4C is a graphic representation 404 of adjusting the buffer fill levels 402 of the buffer of FIG. 4B. The line 406 represents the changes in number of samples in the buffer over time that correspond to the adjustments made to the rate of playback of samples out of the playback buffer 204. The time is represented as 200 ms intervals. In an example, a frequency offset is zero for a buffer level of 40-60%. Over time as samples are received in the buffer 204 from the network 104, the buffer levels rise and fall. This is due in part to the rate that the samples are sent over the network 104 from the audio capture buffer 201. In an example, the system 200 does not attempt to adjust the rate of sending of the audio from the audio capture buffer 201 but instead, adjusts the rate of playback from the playback buffer 204 such that a user does not notice a change in audio sound or quality.

Figure 5:
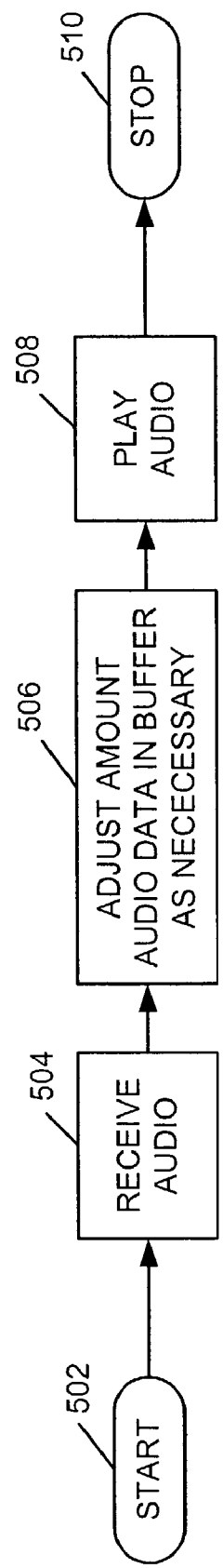
FIG. 5 is a flow chart depicting general functionality, in accordance with one preferred embodiment, of an implementation of an audio stream adaptive frequency system.

FIG. 5 is a flow chart depicting general functionality (or method), in accordance with one preferred embodiment, of an implementation of an audio stream adaptive frequency system. The process begins at 502. At 504, an audio source is received. In a preferred embodiment, the audio source is converted to audio data and sent to a playback destination device. At 506, an amount of audio data in a buffer of the playback destination device is adjusted as necessary. In an example, adjustments to the amount of audio data in the buffer are necessitated because the amount of audio data in the buffer deviates from a target buffer level range. In a preferred embodiment, the adjustment include releasing the samples at a faster rate when the buffer is greater than the target fill level and releasing the samples at a slower rate when the buffer is less than the target buffer level range. At 508, the released audio samples are played by playback hardware, such as a speaker or audio sound card, among others. The process ends at 510.

Figure 6A:
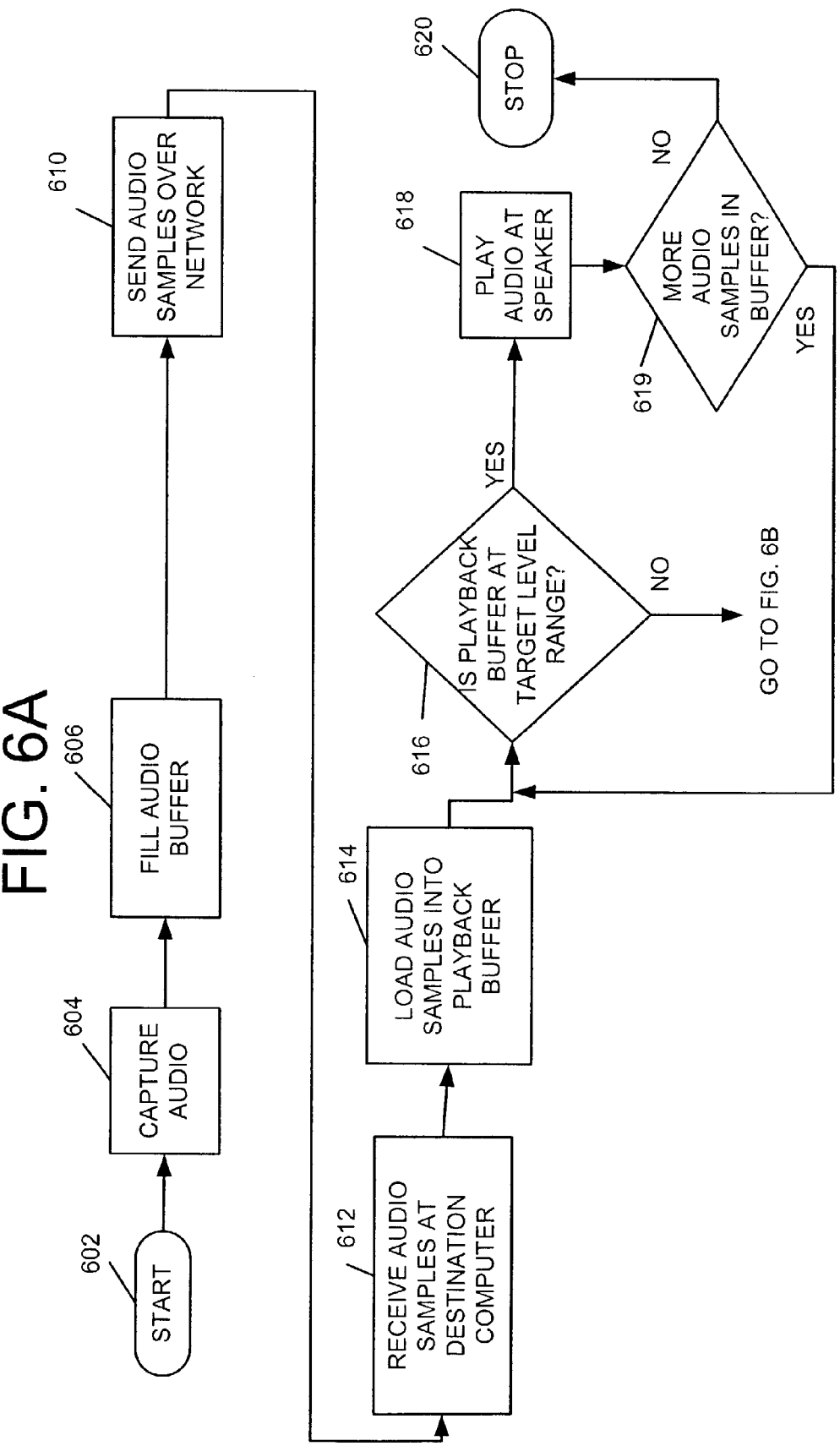
FIGS. 6A and 6B are flow charts depicting more specific functionality, in accordance with one preferred embodiment, of an implementation of an audio stream adaptive frequency system.
Figure 6B:
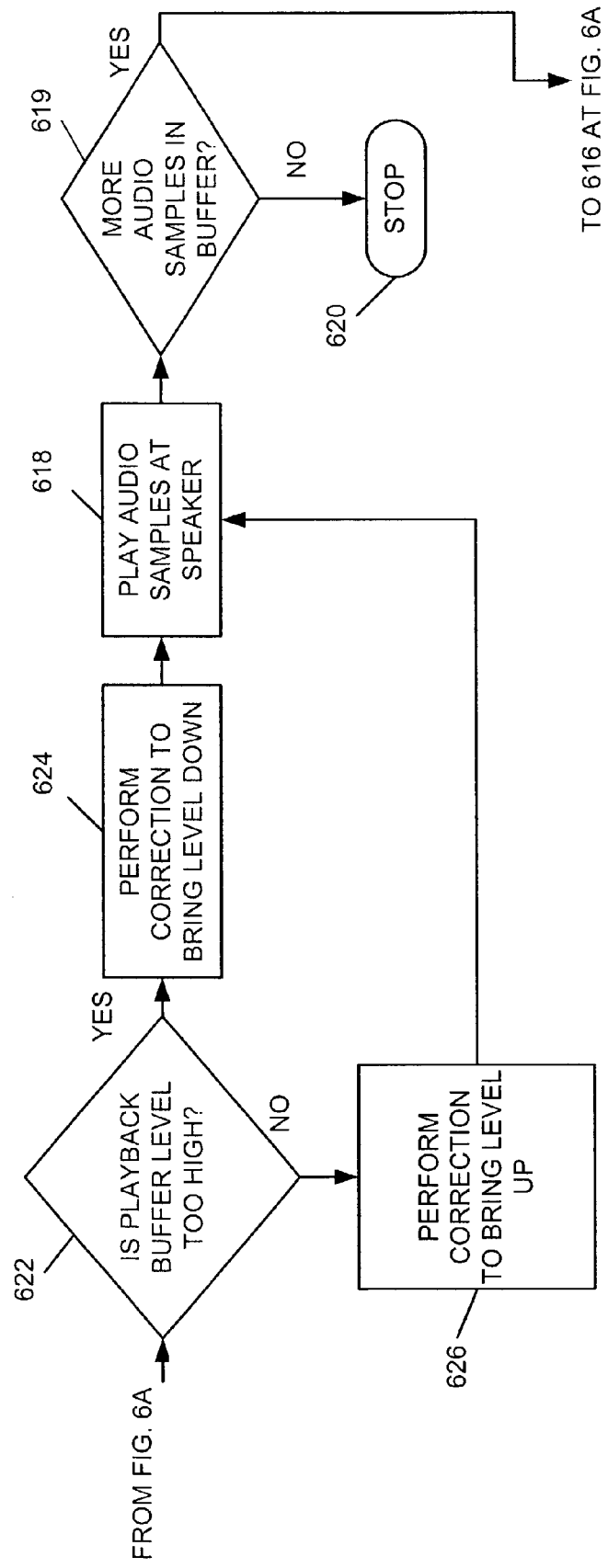

FIGS. 6A and 6B are flow charts depicting more specific functionality (or methods) in accordance with one preferred embodiment, of an implementation of an audio stream adaptive frequency system. Referring to FIG. 6A, the process begins at 602. At 604, an audio source is captured. In an example, the audio source is at a designated frequency range acceptable to listeners (e.g., about 8000 Hz) and is captured by an audio source device. At 606, the captured audio fills a buffer. In a preferred embodiment, the captured audio fills a buffer at the audio source device. At 610, the packetized sample is sent over a network. The packetized samples are received at a destination computer at 612. In a preferred embodiment, the destination computer is an audio playback device.

At 614, the samples are loaded into a playback buffer. In a preferred embodiment, the playback buffer resides at the audio playback device. At 616, a determination is made as to whether the playback buffer is at a target fill level range. If yes, at 618, the audio samples are played at playback hardware, such as a speaker or audio card in a processing device, among others. At 619, a determination is made as to whether there are more audio samples remaining in the buffer. If no, the process ends at 620. If yes, the process continues at 616.

Referring to FIG. 6B, at 622, a determination is made as to whether the playback buffer level range is too high. If yes, at 624, a correction is performed to bring down the target buffer level range. In an example, a correction encompasses playing the audio at a faster rate such that over time, more samples are released from the buffer and the buffer level is reduced. Once the buffer level is at or near the target level range, the audio samples are played at 618. At 619, a determination is made as to whether there are more audio samples remaining in the buffer. If no, the process ends at 620. If yes, the process continues at 616 of FIG. 6A.

If the playback buffer level range is not too high, i.e., the level is too low, at 626, a correction is performed to bring the buffer level up. In an example, a correction encompasses playing the audio at a slower rate such that over time, fewer samples are released from the buffer and the buffer level is increased. Once the buffer level is at or near the target level range, the audio samples are played at 618. At 619, a determination is made as to whether there are more audio samples remaining in the buffer. If no, the process ends at 620. If yes, the process continues at 616 of FIG. 6A.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The present invention provides for a playback device that can play audio without encoded clocking information. The invention also provides for a playback frequency that is constantly synchronized with a source frequency. In addition, the invention provides for playback delays that can be short and consistent without audio breakup.

This invention provides for an adaptive algorithm to vary the playback frequency and maintain a particular buffer level to lock on a remote audio capture frequency. With this invention, no frequency encoding information need be sent.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A method for adjusting a playback frequency for playing back an audio stream on a playback device, the method comprising:

capturing the audio stream at an audio source device;
filling a source buffer provided by the audio source device with at least a portion of the audio stream;
packetizing the audio source into a corresponding audio sample;
sending the audio sample over a network to a playback buffer provided by the playback device;
receiving the audio sample at the playback buffer;
playing back at least a portion of the audio sample from the playback buffer at the playback frequency; and
adjusting a buffer fill level associated with the playback buffer when the buffer level is not within a designated target range, wherein adjusting the buffer level of the playback buffer includes:
determining an offset frequency by which to adjust the playback frequency, so as to achieve the designated target range for the playback buffer, wherein determining an offset frequency includes:
determining a current fill level associated with the playback buffer by determining a difference between a first location within the playback buffer from which the audio sample was last read and a second location within the playback buffer to which the audio sample was last written; and
comparing the current fill level with the designated target range to determine the offset frequency;
adapting the playback frequency by combining the determined offset frequency with a frequency at which the audio sample is arriving at the playback buffer, so as to increase or decrease the frequency at which the audio sample is played from the playback buffer and to adjust the current fill level into the designated target range, the playback frequency being increased or decreased in a graduated manner to prevent perceptible degradation in the audio sample during playback, wherein the audio stream does not encode frequency information, and wherein adapting the playback frequency includes:
playing the audio sample from the playback buffer at a faster rate in response to the offset frequency when the current fill level is higher than the designated target range; and
playing the audio sample from the playback buffer at a slower rate in response to the offset frequency when the current fill level is lower than the designated target range;
establishing the designated target range to be between 40-60% of capacity of the playback buffer;
determining whether more audio data remains in the playback buffer;
continuing to release audio data from the playback buffer as long as audio remains in the playback buffer; and
maintaining at least 200 ms of audio data in the playback buffer at all times.

2. A system for adjusting a playback frequency for playing back an audio stream captured from an audio source, the system comprising:

an audio capture device for sending audio samples that are packetized from the audio stream as captured from an audio source, for filling a source buffer provided by the audio capture device with the audio samples, and for sending the audio sample over a network;
an audio playback device for receiving the audio samples from the audio capture device over the network, wherein the audio playback device includes:
a playback buffer that is configured to adjust playback of the audio samples when the playback buffer is not within a designated target range;
a computer-readable storage medium having a computer program encoded therein for:
playing back at least a portion of the audio sample from the playback buffer at the playback frequency; and
adjusting a buffer fill level associated with the playback buffer when the buffer level is not within a designated target range, wherein adjusting the buffer level of the playback buffer includes:
determining an offset frequency by which to adjust the playback frequency, so as to achieve the designated target range for the playback buffer, wherein determining an offset frequency includes;
i) determining a current fill level associated with the playback buffer by determining a difference between a first location within the playback buffer from which the audio sample was last read and a second location within the playback buffer to which the audio sample was last written; and
ii) comparing the current fill level with the designated target range to determine the offset frequency;
adapting the playback frequency by combining the determined offset frequency with a frequency at which the audio sample is arriving at the playback buffer, so as to increase or decrease the frequency at which the audio sample is played from the playback buffer and to adjust the current fill level into the designated target range, the playback frequency being increased or decreased in a graduated manner to prevent perceptible degradation in the audio sample during playback, wherein the audio stream does not encode frequency information, and wherein adapting the playback frequency includes;
i) playing the audio sample from the playback buffer at a faster rate in response to the offset frequency when the current fill level is higher than the designated target range; and
ii) playing the audio sample from the playback buffer at a slower rate in response to the offset frequency when the current fill level is lower than the designated target range;
establishing the designated target range to be between 40-60% of capacity of the playback buffer;
determining whether more audio data remains in the playback buffer;

continuing to release audio data from the playback buffer as long as audio remains in the playback buffer; and maintaining at least 200 ms of audio data in the playback buffer at all times.

3. A computer-readable storage medium having a computer program for adjusting a playback frequency for playing back an audio stream on a playback device, the computer program comprising:

logic for capturing the audio stream at an audio source device;

logic for filling a source buffer provided by the audio source device with at least a portion of the audio stream;

logic for packetizing the audio source into a corresponding audio sample;

logic for sending the audio sample over a network to a playback buffer provided by the playback device;

logic for receiving the audio sample at the playback buffer;

logic for playing back at least a portion of the audio sample from the playback buffer at the playback frequency; and logic for adjusting a buffer fill level associated with the playback buffer when the buffer level is not within a designated target range, wherein the logic for adjusting the buffer level of the playback buffer includes:

logic for determining an offset frequency by which to adjust the playback frequency, so as to achieve the designated target range for the playback buffer, wherein the logic for determining an offset frequency includes:

logic for determining a current fill level associated with the playback buffer by determining a difference between a first location within the playback buffer from which the audio sample was last read and a second location within the playback buffer to which the audio sample was last written; and logic for comparing the current fill level with the designated target range to determine the offset frequency;

logic for adapting the playback frequency by combining the determined offset frequency with a frequency at which the audio sample is arriving at the playback buffer, so as to increase or decrease the frequency at which the audio sample is played from the playback buffer and to adjust the current fill level into the designated target range, the playback frequency being increased or decreased in a graduated manner to prevent perceptible degradation in the audio sample during playback, wherein the audio stream does not encode frequency information, and wherein the logic for adapting the playback frequency includes:

logic for playing the audio sample from the playback buffer at a faster rate in response to the offset frequency when the current fill level is higher than the designated target range; and logic for playing the audio sample from the playback buffer at a slower rate in response to the offset frequency when the current fill level is lower than the designated target range;

logic for establishing the designated target range to be between 40-60% of capacity of the playback buffer;

logic for determining whether more audio data remains in the playback buffer;

logic for continuing to release audio data from the playback buffer as long as audio remains in the playback buffer; and logic for maintaining at least 200 ms of audio data in the playback buffer at all times.

* * * * *